(12) United States Patent
Candry et al.

(10) Patent No.: US 7,812,300 B2
(45) Date of Patent: Oct. 12, 2010

(54) METHODS AND SYSTEMS FOR IMAGING HAVING AN ILLUMINATION SPLITTING MEANS WITH A DYNAMIC SELECTING MEANS AND A STATIC SELECTING MEANS

(75) Inventors: Patrick Candry, Harelbeke (BE); Koen Malfait, Roeselare (BE)

(73) Assignee: Barco N.V., Kortrijk (BE)

( * ) Notice: Subject to any disclaimer, the term of this patent is extended or adjusted under 35 U.S.C. 154(b) by 469 days.

(21) Appl. No.: 12/005,290

(22) Filed: Dec. 27, 2007

(65) Prior Publication Data

US 2008/0158515 A1    Jul. 3, 2008

(30) Foreign Application Priority Data

Dec. 27, 2006    (EP)    ................................. 06026920

(51) Int. Cl.
    *H01L 27/00*    (2006.01)
(52) U.S. Cl. .................................... 250/208.1; 250/226
(58) Field of Classification Search .............. 250/208.1, 250/226, 216; 353/20, 30, 31, 84, 97; 349/5–10
    See application file for complete search history.

(56) References Cited

U.S. PATENT DOCUMENTS

| 6,802,613 B2 * | 10/2004 | Agostinelli et al. ........... 353/31 |
| 2004/0184005 A1 | 9/2004 | Roth | |

FOREIGN PATENT DOCUMENTS

| EP | 0 435 288 A1 | 7/1991 |
| EP | 0 897 641 B1 | 2/1999 |
| EP | 1 662 804 A1 | 5/2006 |
| FR | 2 854 698 A1 | 11/2004 |
| WO | WO 01/43113 A1 | 6/2001 |

(Continued)

OTHER PUBLICATIONS

European Search Report dated May 8, 2007 relating to European Application No. 06026920.6-2202, priority of which is claimed in this application.

(Continued)

*Primary Examiner*—Que T Le
(74) *Attorney, Agent, or Firm*—Bacon & Thomas, PLLC (57) ABSTRACT

An imaging system (100) for displaying color images is described. The imaging system (100) comprises an illumination source (102) for generating an illumination beam, an illumination splitting means (106) typically for generating different primary color illumination beams and a plurality of image modulators (104*a*, 104*b*, 104*c*). The illumination splitting means (106) comprises a dynamic selecting means (108) adapted for, for a single color image to be imaged, subsequently generating different sub-sets of primary color sub-beams from said illumination beam and directing these sub-sets of primary color sub-beams to a static selecting means (110). The illumination splitting means (106) also comprises a static selecting means (110) adapted for, for each of said subsequently generated sub-sets of primary color sub-beams, directing primary color sub-beams to said plurality of image modulators (104*a*, 104*b*, 104*c*) for modulating each of said directed primary color sub-beams from said sub-sets for generating said single color image to be imaged. The invention furthermore relates to a controller for synchronization between the image modulators and the dynamic selecting means and to a method for imaging an image.

21 Claims, 8 Drawing Sheets

FOREIGN PATENT DOCUMENTS

WO    WO 2006/126118 A2    11/2006

OTHER PUBLICATIONS

S. Roth et al., "Four Primary Color Projection Display", Shmuel Roth; Genoa Color Technologies, Herzelia, Israel; Walt Caldwell; Advanced digital Optics, Westlake Village, CA.

S.J. Roosendaal et al, A Wide Gamut, High Aperture Mobile Spectrum Sequential Liquid Crystal Display, 2005 SID International Symposium, Boston, MA, May 24-27, 2005, SID International Symposium, San Jose, CA., May 24, 2005, pp. 1116-1119.

Summons to Attend Oral Proceedings Regarding European Patent Application No. 06026920.6, Oct. 29, 2009.

* cited by examiner

METHODS AND SYSTEMS FOR IMAGING HAVING AN ILLUMINATION SPLITTING MEANS WITH A DYNAMIC SELECTING MEANS AND A STATIC SELECTING MEANS

TECHNICAL FIELD OF THE INVENTION

The present invention relates to methods and systems for imaging information. More particularly, the present invention relates to colour imaging systems and methods for imaging coloured information based on image modulating devices, such as e.g. liquid crystal light valves and digital mirror devices.

BACKGROUND OF THE INVENTION

Conventional projection systems typically use 3 primary colours (red, green and blue) for the reproduction of colour images. The colour gamut that can be produced by an additive combination of the 3 primary colours nevertheless is limited. The colour gamut depends on the dominant wavelength (hue) and on the excitation purity (saturation) of each of the primary colours. The visible colours, the primary colours and the gamut of produced colours are usually represented in a chromaticity diagram e.g. CIE 1931 chromaticity diagram or CIE 1976 U.C.S. (Uniform Chromaticity Scale).

One solution to produce a wider colour gamut is by increasing the excitation purity of the primary colours, or in other words to narrow the spectral pass band of each of the three primary colours. An alternative solution to produce a wider colour gamut may be the use of more primary colours, such as e.g. using 4, 5, 6 or more colours instead of 3 colours. In printing devices, where subtractive mixing of colours is performed (by different ink cartridges), the commonly used colours are cyan, magenta, yellow and black (CMYK). In special printers, dedicated for certain types of printing, additional colours such as e.g. indigo also are used. In display technology, several techniques are known to apply more than three primary colours. One option is to generate a wider colour gamut by generating more than three primary colours by filtering them from a white illumination source and modulating them sequentially according to image data using a single chip modulation system. In such a system, typically the amount of illumination from the illumination source that is not used for displaying the image is relatively high resulting in a less efficient system. In another option, the wider colour gamut is generated by guiding more than three primary colours each to a primary colour dedicated modulator, where the primary coloured sub-beam is modulated. The latter typically results in complex and expensive systems. An example of such a system is a display system using four primary colours, each primary colour sub-beam modulated by its own primary colour dedicated modulator, as described for example in "Four primary colour projection display" by Roth and Caldwell in SID 05 Digest (2005) 1818.

Adding more primary colours also introduces an electronic puzzle as to how to describe the colour space, as each colour to be displayed needs to be produced by combining the different primary colours, i.e. by subtracting in the case of printing, or by adding in the case of a display system. A method of handling the data conversion for generating images to be displayed using more than three primary colours has been described e.g. in European Patent EP 0 897 641 B1 by BARCO N. V.

SUMMARY OF THE INVENTION

It is an object of the present invention to provide apparatus and methods for imaging with good imaging quality. The good imaging quality may be obtained by using a wide colour gamut or by allowing imaging having a wide dynamic range with good contrast. It is an advantage of embodiments of the present invention that imaging systems and methods are obtained that only require a limited number of image modulators. It thus is an advantage of particular embodiments of the present invention that the number of primary colours available in the imaging system may be larger than the number of image modulators that are available.

The imaging systems and methods according to particular embodiments of the present invention have the advantage that a wide colour gamut is obtained, while reducing loss or preventing too much loss of illumination for the imaging.

The above objective is accomplished by a method and device according to the present invention.

The present invention relates to an imaging system for displaying colour images, the imaging system comprising an illumination source for generating an illumination beam, an illumination splitting means and a plurality of image modulators, wherein the illumination splitting means comprises a dynamic selecting means adapted for receiving at least one illumination beam and subsequently generating different sets of primary colour sub-beams from the at least one illumination beam and a static selecting means adapted for receiving at least one illumination beam and splitting the at least one illumination beam in different sets of primary colour sub-beams from the at least one illumination beam, wherein, for generating a single colour image, the dynamic selecting means and the static selecting means are adapted for cooperating such that subsequently generated different sets of primary colour sub-beams generated by the dynamic selecting means are directed to the static selecting means where primary colour sub-beams of each of said subsequently generated different sets are directed by the static selecting means to the plurality of image modulators for modulating each of the directed primary colour sub-beams from said sets for generating the single colour image to be imaged or such that different sets of primary colour sub-beams generated by the static selecting means are directed to the dynamic selecting means where they are used to generate subsequently generated further sets of primary colour sub-beams and directed to the plurality of image modulators for modulating each of the directed primary colour sub-beams from said further sets for generating the single colour image to be imaged.

The imaging system for displaying colour images may for example be an imaging system comprising an illumination source for generating an illumination beam, an illumination splitting means and a plurality of image modulators, wherein the illumination splitting means comprises a dynamic selecting means adapted for, for a single colour image to be imaged, subsequently generating different sets of primary colour sub-beams from said illumination beam and directing these subsets of primary colour sub-beams to a static selecting means, the static selecting means adapted for, for each of said subsequently generated sets of primary colour sub-beams, directing primary colour sub-beams to said plurality of image modulators for modulating each of said directed primary colour sub-beams from said sets for generating said single colour image to be imaged.

A different set of different primary colour sub-beams is a set comprising at least one primary colour sub-beam having a substantially different emission intensity or a substantially different colour.

At least one, optionally all, image modulator may be adapted for modulating each of said directed primary colour sub-beams to contribute to a predetermined colour or a predetermined emission intensity for pixels of said single colour image.

With different sets of different primary colour sub-beams there is meant that for each two sets at least one primary sub-beam of the sets differs in spectral behaviour. Alternatively or in addition thereto, with different sets of different primary colour sub-beams there may be meant that for each two sets at least one primary colour sub-beam of the sets differs in intensity behaviour.

The different sets of primary colour sub-beams may comprise at least one primary colour sub-beam having a different colour. It is an advantage of particular embodiments of the present invention that imaging systems with improved colour gamut are obtained.

The dynamic selecting means may be adapted for subsequently providing different spectral filters in the illumination beam path.

The static selecting means may comprise a plurality of fixed spectral filters for directing different primary colour sub-beams to different image modulators.

The different spectral filters of said dynamic selecting means may have distinguished spectral overlap with different fixed spectral filters of said static selecting means. The distinguished spectral overlap of one spectral filter of the dynamic selecting means may be non-overlapping with the distinguished spectral overlap of another spectral filter of the dynamic selecting means. It is an advantage of particular embodiments of the present invention that primary colour sub-beams emitting in substantially different wavelength ranges are obtained.

The different spectral filters of the dynamic selecting means may have a spectral overlap with different fixed spectral filters of said static selecting means in the same spectral ranges, but wherein the spectral overlap for a first spectral filter of said dynamic selecting means is substantially more narrow than the spectral overlap for a second spectral filter of said dynamic selecting means resulting in a first sub-set of primary colour sub-beams having a substantially higher intensity than a second sub-set of primary colour sub-beams and in a second sub-set of primary colour sub-beams having a substantially higher colour purity than a first sub-set of primary colour sub-beams.

It is an advantage of particular embodiments of the present invention that imaging systems are obtained wherein, depending on the requirements, colour images with high colour purity as well as colour images with high intensity can be generated.

The different sets of primary colour sub-beams may comprise at least one primary colour sub-beam having a different emission intensity.

It is an advantage of particular embodiments of the present invention that imaging systems adapted for imaging images with a large dynamic range are obtained.

The dynamic selecting means may be adapted for subsequently providing different neutral density filters in the illumination beam path.

The number of different primary colour sub-beams generated by the illumination splitting means may be larger than the number of image modulators of the imaging system. It is an advantage of particular embodiments of the present invention that imaging systems are obtained having improved imaging quality compared to conventional 3-chip imaging systems, while not requiring more image modulators. The latter results in a reduction of cost, both economically and in manufacturing effort.

The imaging system may comprise a synchronisation means for synchronising said dynamic selecting means for subsequently generating different sets of primary colour sub-beams with said plurality of image modulators for modulating each of said primary colour sub-beams of said different sets.

The imaging system may comprise an image processing means for generating primary colour sub-beam modulation data for said image modulators in agreement with said predetermined colour or predetermined emission intensity for pixels of said single colour image to be obtained.

The illumination source may comprise a plurality of different coloured illumination sub-sources, wherein the dynamic selecting means may be a controller for controlling the plurality of different coloured illumination sub-sources.

The illumination splitting means may be adapted for splitting the illumination beam in a part substantially having a wavelength between 400 nm and 680 nm and a part substantially having a wavelength outside that region.

The imaging system may be adapted for temporary selectively positioning the dynamic selecting means in the light path of the illumination beam. Such selectively positioning may comprise a mechanical deplacement outside the light path of the system or it may comprise an electronic neutralisation, e.g. using colorlink filters instead of dichroic filters.

The dynamic selecting means may comprise or consist of a colour wheel, wherein a speed of the colour wheel is selected for generating the different colour sub-beams.

The present invention also relates to a controller for controlling an imaging system as described above, the controller comprising a dynamic filter controlling means for controlling a variation of the filtering properties of the dynamic selecting means provided in the illumination beam path for dynamic filtering of an illumination beam and an image processing controlling means for controlling a provision of image data to a plurality of illumination modulators, wherein said controller provides synchronisation between said dynamic selecting means and said image modulators.

Controlling and provision of image data to the image modulators may comprise providing generated image data to the image modulators for each of a plurality of primary colour sub-beams generated by said dynamic filtering and an additional static filtering of the illumination beam. The controller furthermore may comprise an illumination source controlling means for controlling an illumination source of the imaging system.

The present invention also relates to an imaging setup for imaging colour images, the imaging setup comprising a plurality of imaging systems, at least one imaging system being an imaging system as described above, whereby the plurality of imaging systems are adapted for together generating a single colour image.

The present invention furthermore relates to a method for imaging colour images, the method comprising generating an illumination beam for a single colour image to be imaged, dynamically selecting, i.e. over time, different sets of primary colour sub-beams and statically selecting for each of the subsequently generated different sets of primary colour sub-beams, primary colour sub-beams, and modulating said statically selected primary colour sub-beams for generating said single colour image to be imaged using a plurality of image modulators.

Modulating said statically selected primary colour sub-beams may comprise modulating each of said statically selected primary colour sub-beams to contribute to a predetermined colour or a predetermined emission intensity for pixels of said single colour image.

The present invention also relates to a computer program product for performing, when executed on a computing means, a method for imaging an image as described above or part thereof. The invention also relates to a machine readable data storage device storing such a computer program product and transmission of such a computer program product over a local area telecommunications network.

It is an advantage of embodiments of the present invention that the number of image modulators may be reduced while still developing a large number of different primaries, resulting in a cost-effective device, both economically and with respect to manufacturing effort.

It is an advantage of particular embodiments of the present invention that the purity of the primary colours that may be used can be larger.

Particular and preferred aspects of the invention are set out in the accompanying independent and dependent claims. Features from the dependent claims may be combined with features of the independent claims and with features of other dependent claims as appropriate and not merely as explicitly set out in the claims.

Although there has been constant improvement, change and evolution of devices in this field, the present concepts are believed to represent substantial new and novel improvements, including departures from prior practices, resulting in the provision of more efficient, stable and reliable devices of this nature.

The teachings of the present invention permit the design of improved methods and apparatus for imaging information, the methods and systems having an good imaging quality, e.g. a wide colour gamut, such as e.g. projection systems having a wide colour gamut.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

In the different figures, the same reference signs refer to the same or analogous elements.

DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

The following terms are provided solely to aid in the understanding of the invention. These definitions should not be construed to have a scope less than understood by a person of ordinary skill in the art.

The term primary colour and correspondingly primary colour sub-beam in the present invention is not restricted to typical standard primary colours such as red, green and blue or cyan, magenta, yellow, but it relates to every colour that is used as a basic colour for building up an image. The latter may e.g. include various shades or types of red, green and blue, magenta, cyan or yellow or any suitable colour that can be used as basic colour. Such colour may typically be defined using colour coordinates as described by the Commission Internationale de l'Eclairage CIE 1931 or CIE 1976. The term imaging system in the present invention is used for indicating each system that allows to generate images. A typical example thereof may be a projection system, although the present invention is not limited thereto.

The invention will now be described by a detailed description of several embodiments of the invention. It is clear that other embodiments of the invention can be configured according to the knowledge of persons skilled in the art without departing from the true spirit or technical teaching of the invention, the invention being limited only by the terms of the appended claims.

Figure 1:
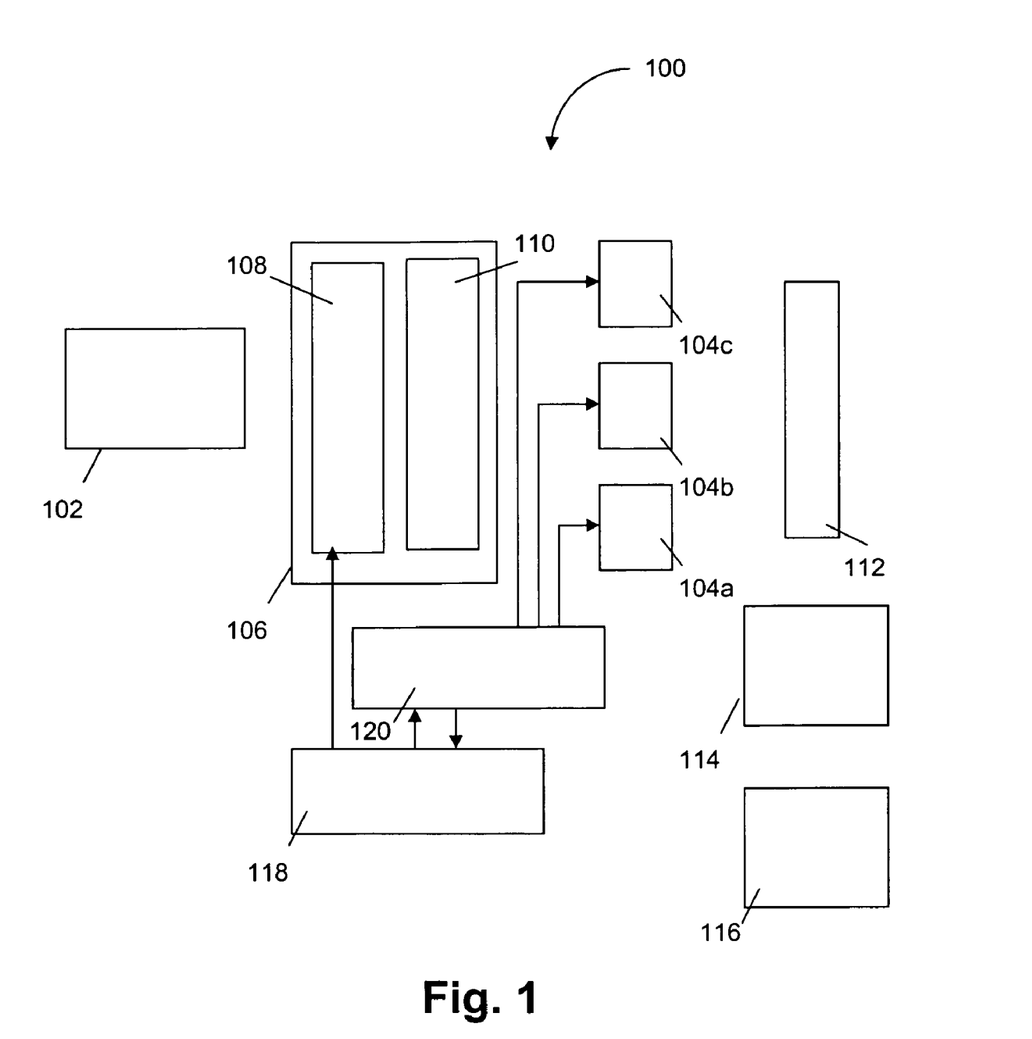
FIG. 1 shows a schematic illustration of a display system with a dynamic and static selecting means for generating colour images according to a first embodiment of the present invention.

In a first aspect, the present invention relates to an imaging system for displaying colour image information with high image quality, i.e. for example with a high colour gamut and/or with a large dynamic range. The latter is obtained by providing a system making use of a plurality of primary colours, e.g. more than the three primary colours typically used in display technology, i.e. red, green and blue (RGB). Each primary colour has a predetermined emission intensity and a predetermined colour, as e.g. described by a colour coordinate system as established by CIE. In embodiments of the present invention, the primary colours typically are modulated with a plurality of image modulators, whereby the number of image modulators typically is smaller than the total number of primary colours used. This has the advantage that systems can be used with a relatively small number of image modulators, leading to a possibly less complicated set-up and to the possibility to avoid the need of expensive additional image modulators. In this way a reduction in both economical and manufacturing effort cost is obtained. The imaging system optionally comprises an illumination splitting means for generating a plurality of sets of primary colour sub-beams using both a dynamic selecting means and a static selecting means. A schematic overview of an exemplary imaging system 100 according to the first embodiment is shown in FIG. 1.

The imaging system 100 of the first embodiment optionally comprises an illumination source 102 for generating an illumination beam, e.g. a substantially white illumination beam. It is to be noted that, in the present application, with a substantially white illumination beam there is meant an illumination beam comprising intensity contributions at a plurality of wavelengths, e.g. representative for the full visible spectrum. This might e.g. be an illumination source having substantial contributions throughout substantially the full visible spectrum. Typical illumination sources that may be used are e.g. an arc lamp, such as for example a Xenon short arc lamp or an UHP short arc lamp, one or a plurality of LEDs or a plurality of laser light sources. Alternatively, a number of illumination sources may be used each emitting at different wavelengths or wavelength ranges, which all contribute, thus generating a substantially white illumination beam.

The imaging system 100 of the present invention furthermore comprises a plurality of image modulators 104a, 104b, 104c. Such image modulators change their modulation settings in time in order to introduce image information in the illumination beams. The change of modulation settings may be done as function of an electronic signal they witness. The image modulators sometimes are referred to as spatial light modulators as they introduce different intensity values in different positions of the cross section of the illumination beam in order to introduce image information. The number of image modulators 104a, 104b, 104c is at least two, as the invention does not relate to single chip colour imaging devices. By selecting at least two image modulators 104a, 104b, 104c, an imaging system 100 is obtained having a high efficiency and high illumination power handling capability. Optionally the number of image modulators 104a, 104b, 104c may be three, thus making the imaging system compatible with typical modulator-based imaging systems used in the state of the art, although the invention is not limited thereto. According to embodiments of the present invention, the number of image modulators 104a, 104b, 104c optionally is smaller than the number of primary colours that typically can be used in the imaging system to image full colour information. The image modulators 104a, 104b, 104c can be any suitable device which comprises an array of individually addressable and individually drivable image modulating pixels, which can be driven to represent an arbitrary image. The image modulators 104a, 104b, 104c can be e.g. a digital light processing device (DLP) such as a digital mirror device (DMD), a liquid crystal on silicon (LCOS) device, a liquid crystal display (LCD), but is not limited thereto. The image modulators 104a, 104b, 104c may be of the transmissive type or reflective type. Such image modulating means 104a, 104b, 104c may comprise an array of individually addressable pixels (m×n), each individual addressable pixel acting as an illumination valve, allowing to either block the illumination by absorbing it or by reflecting it out of the further illumination path or to be transmitted or reflected in that part of the overall picture. The state of each pixel optionally may be set to provide the desired colour content for that pixel of the image that is to be displayed. Fast image generating image modulators 104a, 104b, 104c, such as e.g. digital light processing modulating means, optionally are preferred, as in embodiments of the present invention sub-images preferably are generated relatively quickly. Optionally the generation of images needs to be sufficiently faster than the integration or resolution time of the human eye. By way of example, embodiments of the present invention will be further described with reference to systems using digital light processing modulators, the invention not being limited thereto.

The imaging system 100 of the present invention furthermore comprises an illumination splitting means 106 for splitting the substantially white illumination beam into a number of primary colour beams. Optionally, the illumination splitting means 106 comprises a dynamic selecting means 108 and a static selecting means 110. The dynamic selecting means 108 optionally is adapted to modulate the substantially white illumination beam differently at different moments in time. In other words the dynamic selecting means 108 optionally modulates the substantially white illumination beam differently over time. The dynamic selecting means 108 therefore also may be referred to as a temporal selecting means or beam color temporal modulator. Optionally the dynamic selecting means 108 may be adapted for selecting different sets of primary colour sub-beams over time. Selecting different sets of primary colour sub-beams over time thereby comprises selecting different sets of primary colour sub-beams wherein at least one of a colour or luminance of at least one primary colour sub-beam differs. The dynamic selecting means 108 optionally may allow to modulate the provided substantially white illumination beam differently during different time spans within the time frame of generating an image. If e.g. optionally an image to be shown is imaged in a time frame T, the dynamic selecting means 108, in other words, may be adapted for modulating the incident white illumination differently during time spans within this time frame T. The number of different modulations and thus of different sets of primary colour sub-beams that are generated may be two, three or more, but the present invention is not necessarily limited to a particular number. However, as at least one of the image modulators 104a, 104b, 104c will be driven differently for different primary colour sub-beams, the number of different dynamic selections within one time frame T may be limited to two or three, in order to be able to drive the image modulators 104a, 104b, 104c appropriately.

As described above, by applying different spectral filtering during the time frame T for generating an image, sets with different primary colour sub-beams are obtained. Different sets of primary colour sub-beams may be generated wherein at least one primary colour sub-beam has a different colour. The latter may be expressed as there being at least one primary colour sub-beam generated with different colour coordinates than primary colour sub-beams generated during another time span in the time frame for generating an image. In this way e.g. imaging systems with four or more colours may be created requiring e.g. only three image modulators 104a, 104b, 104c. This has the advantage of obtaining an imaging system with a high efficiency, a high illumination power handling capability while having a relatively low cost due to the limited number of image modulators needed. These imaging systems typically have the advantage of providing a wide colour gamut. Optionally the modulation and/or selection may be performed periodically and significantly quickly such that the human vision system is not able to distinguish the different primary colour sub-beams from the different sets over time. A typical dynamic selecting means 108 may e.g. be a colour wheel, a plurality of colour filters, such as e.g. dielectric interference filters, that is brought in the illumination path alternating, or, in case the illumination source is a combination of a number of different illumination sources, the dynamic selecting means 108 also may comprise a control means for driving different sets of illumination sources differently during different time frames.

Figure 2A:
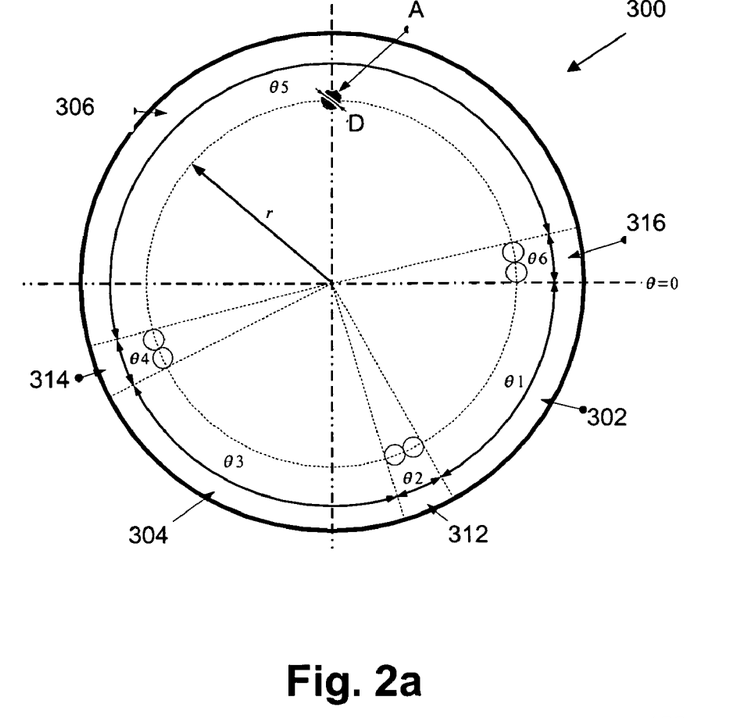
FIG. 2a shows a schematic illustration of a dynamic spectral selecting means as can be used in an imaging system according to a first aspect of the present invention.

An example of a dynamic spectral selecting means 300 is illustrated in FIG. 2a, showing an implementation of an exemplary colour wheel 300. The dynamic spectral selecting means 300 may comprise a number of segments 302, 304, 306 to be brought into the illumination path having a predetermined spectral characteristic allowing to select different sets of primary colour sub-beams. In the example shown, three different segments 302, 304, 306 are shown each with its respective spectral characteristic. In the example described below, different transmission characteristics are provided. The colour filters applied in the different segments 302, 304, 306 to obtain the different transmission characteristics may e.g. be dielectric interference filters. One way of operating such a colour wheel 300 is by providing a given velocity, e.g. a constant velocity, to the colour wheel whereby e.g. one turn corresponds with one time frame for generating an image. The present invention is not restricted to this example. One can easily transform all described embodiment to a non-constant velocity colour wheel, where the segmentation of the colour wheel to get a desired overall colour impression is replaced by speeding up of slowing down of the colour wheel to change the amount of colour illumination of one beam with respect to another coloured beam. For an illumination beam having a circular spot A and a diameter D incident on a rotating colour wheel 300, time spans are created wherein a fixed set of primary colour sub-beams is generated and wherein the primary colour sub-beams of that set generated by filtering the incident substantially white illumination beam and using the different transmission characteristic, may be modulated using the image modulators 104a, 104b, 104c. In the present example, transition regions 312, 314, 316 are provided on the dynamic selecting means 300 for providing transition times to transfer to a filter for selecting another set. Optionally the image modulators 104a, 104b, 104c are blanked or switching during these transition times.

Alternatively or in addition thereto, the dynamic selecting means 108 also may be a filter means for filtering the emission intensity of at least one of the primary colour sub-beams, resulting in a set wherein at least one of the primary colour sub-beams has a different intensity than in another set. A number of means are known to reduce the emission intensity for a given colour sub-beam, such a e.g. a dedicated colour filter, a neutral density filter, etc. Optionally, such filters may be based on absorbing coatings or patterned layers, allowing to transmit only a fraction of the emission. The dynamic selecting means 108 may filter the intensity while not changing the colour of the primary colours generated in the different sets, e.g. using a neutral density filter which optionally has a flat spectral response. In one embodiment, a neutral density filter is used for reducing the emission intensity of all primary colour sub-beams available resulting in a set with given primary colour sub-beams having a high emission intensity and a set with the same given primary colour sub-beams but with a substantially lower emission intensity. By modulating these sub-beams during the different time spans of the sub-beam selection, a large dynamic range is obtained with the imaging system and/or improved gray-level imaging may be obtained, without substantially reducing the contrast that can be shown.

Figure 2B:
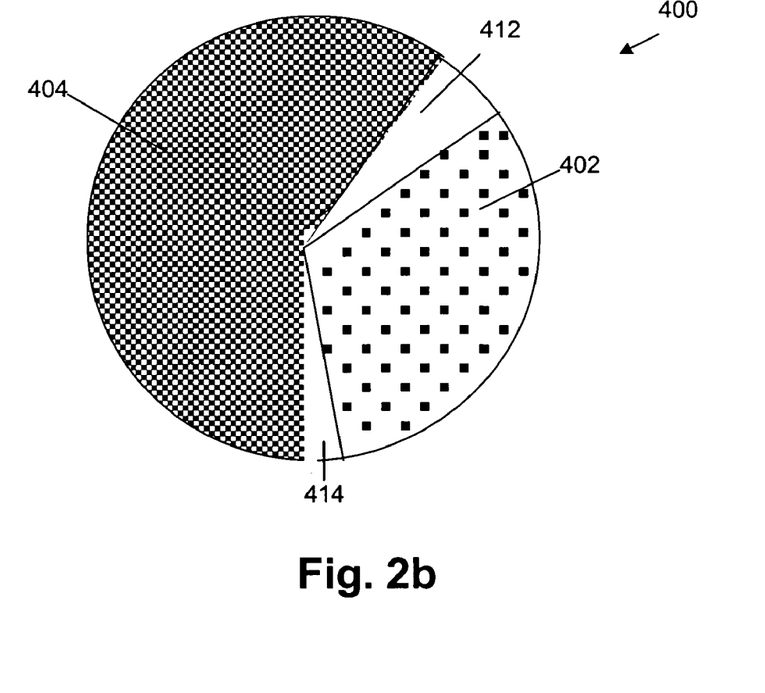
FIG. 2b shows a schematic illustration of a dynamic intensity selecting means as can be used in an imaging system according to a first aspect of the present invention.

An example of a dynamic selecting means allowing to select sets with different emission intensities is, by way of illustration, shown in FIG. 2b. The dynamic intensity selecting means 400 shown is in the form of a dimming wheel, wherein in two segments 402, 404 different emission intensities are selected for all primary colour sub-beams of a white illumination beam incident on the rotating dimming wheel. Furthermore transition regions 412, 414 are provided for providing the transition from one set to another, whereby optionally the image modulators 104a, 104b, 104c are blanked.

Alternatively or in addition thereto, the illumination unit 102 and the dynamic selecting means 108 also may be introduced wherein the dynamic colour and/or intensity light sub-beams are generated by rapid ON-OFF switching of the light sources which are used in the illumination unit 102. Such light sources may for example be LEDs or laser sources having very short switching cycles and therefore suitable for applications like this. Such an illumination unit 102 and dynamic selecting means 108 combination may for example allow generation of sequential primary colour beams without the need of an optical component such as e.g. a colour wheel. The dynamic selecting means 108 in the present example may comprise a driving unit for the illumination system allowing switching and synchronisation of the different light sources in the illumination unit 102.

Figure 3:
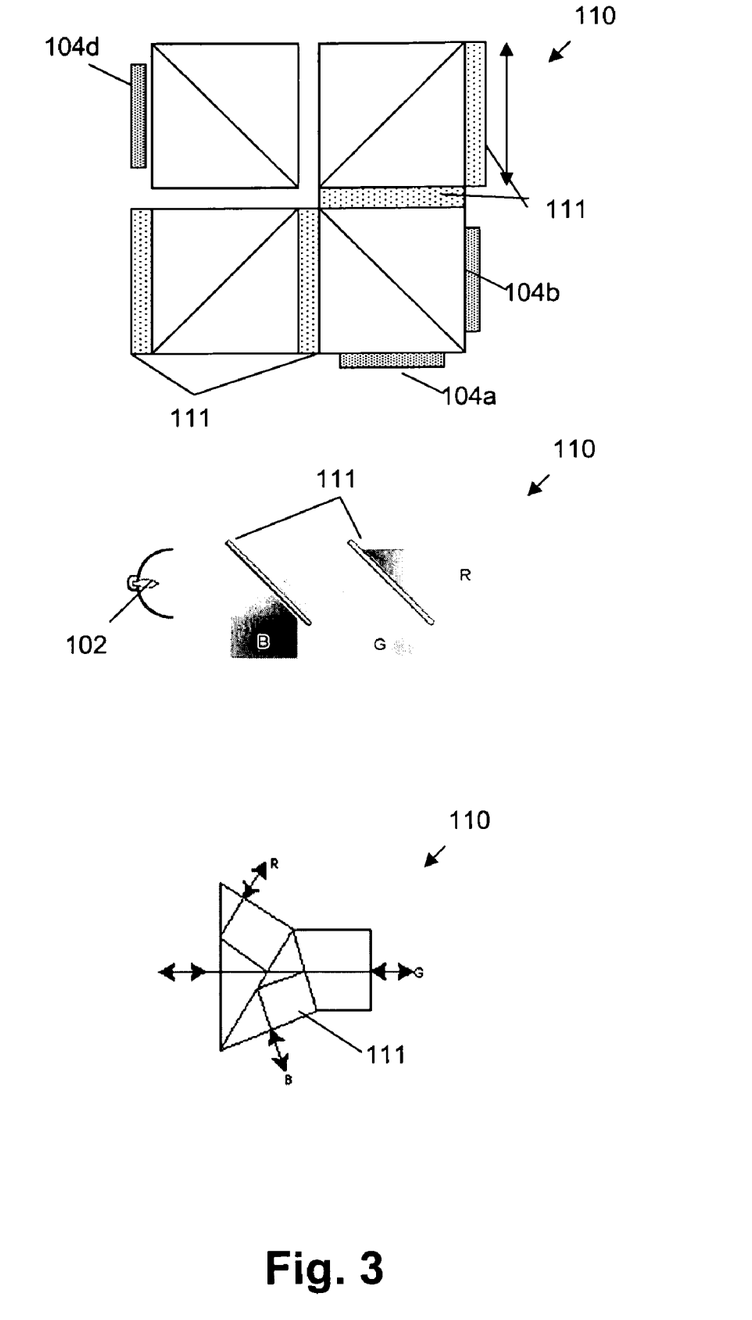
FIG. 3 illustrates three exemplary static selecting means for generating colour sub-beams as can be used in embodiments according to the present invention.

As described above, the illumination splitting means 106 furthermore comprises a static selecting means 110 for splitting the set of primary colour beams into separated different primary colour beams. The static selecting means 110 also may be referred to as spatial selecting means or a spatial deflector as it spatially guides the different primary colour sub-beams of the set in different directions. Optionally the static selecting means 110 may be adapted for guiding the different primary colour beams to different image modulators 104a, 104b, 104c. Such static selecting means 110 may be a normal colour splitting means as typically used in imaging systems, such as e.g. a combination of fixed colour filters, an X-cube, a prism etc. Examples thereof are shown by way of illustration in FIG. 3. The examples show the static selecting means 110 in combination with image modulators 104a, 104b, 104c and further optical components 111. Selecting the separate different primary colour sub-beams may in other words be performed using different spectral filters. Optionally, the static selecting means 110 may allow to select separate different primary colour sub-beams in each of the different sets. The static selecting means 110 may be adapted for, for each set of primary colour sub-beams generated by the dynamic selecting means 108, guiding, e.g. reflecting, different primary colour sub-beams to a different image modulator 104a, 104b, 104c. In case of a dynamic spectral selecting means 108, the spectral characteristic of the static selecting means 110 may be adapted and selected such that, for each set, it guides different primary colour sub-beams of the set to a different image modulator 104a, 104b, 104c.

The use of both a dynamic and static selecting means results in good imaging qualities and a high flexibility in primaries that can be selected. The order in which the dynamic and static selecting means are used in the light path with respect to the position of the illumination source is not limiting. On the light path after the illumination source, the dynamic selecting means may be positioned such that the light first passes the dynamic selecting means and then passes the static selecting means on their way, i.e. on the light path, to the light modulators, or the light may first pass the static selecting means and then the dynamic selecting means. In the latter case, more dynamic selecting means components may be required, i.e. one for each light path splitted by the static selecting means. For example, primary colour sub-beams having a distinguished spectral overlap can be selected to generate primary colour sub-beams for clearly distinguished primary colours such as red, green, blue and cyan, magenta and yellow. Alternatively, primary colour sub-beams may be selected wherein one set of primary colour sub-beams has a substantially narrower spectral characteristic within the spectral range of a second set of primary colour sub-beams. In this way a first set with more pure colour characteristics than a second set may be obtained. The use of two different filtering means furthermore reduces the stringent requirements for the filters used, as only the convolution of the spectral characteristics need to fulfil the actual requirements. This can result in filters that are easier to manufacture and cheaper. In this way, the present example optionally also may be used for generating primary colour sub-beams.

Another example is the generation of two primary colour sub-beam sets wherein the colour of the primary colour sub-beams is substantially not different, but wherein the intensity is different. The latter typically may be used for generating images with a white dynamic range, by using the primary colour sub-beam set with high intensity for high intensity fractions of an image, while using only the primary colour sub-beam set with low intensity for dark fractions of an image.

An imaging system 100 according to the present invention comprises a dynamic selecting means 108 and a static selecting means 110 has several advantages if the dynamic selecting means 108 can be mechanically or electronically switched off. In other words, the imaging system 100 according to the present invention may be adapted for selecting between an ON-mode and OFF-mode wherein the dynamic selecting means 108 respectively is used or not used. Light losses which are inevitably introduced by use of the dynamic selecting means 108 can be reduced if this dynamic selecting means is removed from the system light path in applications where it is not needed.

The imaging system 100 furthermore optionally may comprise an illumination recombination means 112. The illumination recombination means optionally may be a spatial colour combiner. The illumination recombination means may physically be the same component as the spatial selecting means 110, e.g. in case the image modulator reflects the illumination back into the direction from where it came. The illumination recombination means 112 nevertheless also may be a separate means. The imaging system 100 furthermore optionally may comprise imaging optics 114 for imaging the resulting illumination beams onto a screen 116 and it may comprise a screen, although the latter also may be external and not part of the imaging system 100. For obtaining correct imaging by the imaging system 100, optionally also a synchronization means 118 and an imaging processing means 120 may be present in the imaging system 100. The synchronization means 118 thereby is adapted for synchronizing the selection of different sets of primary colour sub-beams with the image modulation of the different primary colour sub-beams by the image modulators 104a, 104b, 104c. In this way for each primary colour sub-beam of different subsequent sets different image modulation may be performed. The imaging processing circuit 120 optionally may calculate which image modulation needs to be performed for which primary colour sub-beam in order to obtain an appropriate image to be imaged. The imaging processing means 120 optionally may comprise a computing device, e.g. microprocessor, for instance it may be a micro-controller. It may e.g. comprise a programmable digital logic device such as a Programmable Array Logic (PAL), a Programmable Logic Array, a Programmable Gate Array, especially a Field Programmable Gate Array (FPGA). As images are generally generated based on three primary colour contents, typically the imaging processing means 120 will need to perform a colour space transformation to optimally use the new possible primary colours. Such processing typically may be based on an algorithm. Nevertheless, in some cases, the images may already be in appropriate file format and a transformation to another colour space may not be necessary anymore. Typically, images based on computer aided-design programs may be directly made to fit a larger number of primary colours, e.g. the number of primary colours that can be generated by the imaging device. If a transformation is needed, a 3-dimensional colour matrix representing the signal may need to be translated into a 3-dimensional colour matrix in the RGB-colour triangle. One possibility for imaging a predetermined colour is to always use only three primaries of a colour triangle wherein the colour coordinates of the predetermined colour to be imaged is located. Another exemplary solution that may be used is a method for performing a transformation as described for example in EP 0 897 641 B1 by Barco N. V.

Optionally a number of additional optical components, not shown, such as lenses or mirrors also may be provided, e.g. for focussing the illumination or for deflecting the illumination into another direction. Such additional optical components may e.g. be present between the dynamic selecting means 108 and the static selecting means 110 and may e.g. perform adaptation of the illumination beam, e.g. the set of primary colour sub-beams, to adapt to the shape of the next optical component such as to the shape of the static selecting means and the required illumination pattern, e.g. to obtain a rectangular uniform image.

The first embodiment of the present invention will be illustrated by way of an example, the first embodiment of the present invention not being limited thereto.

Figure 4:
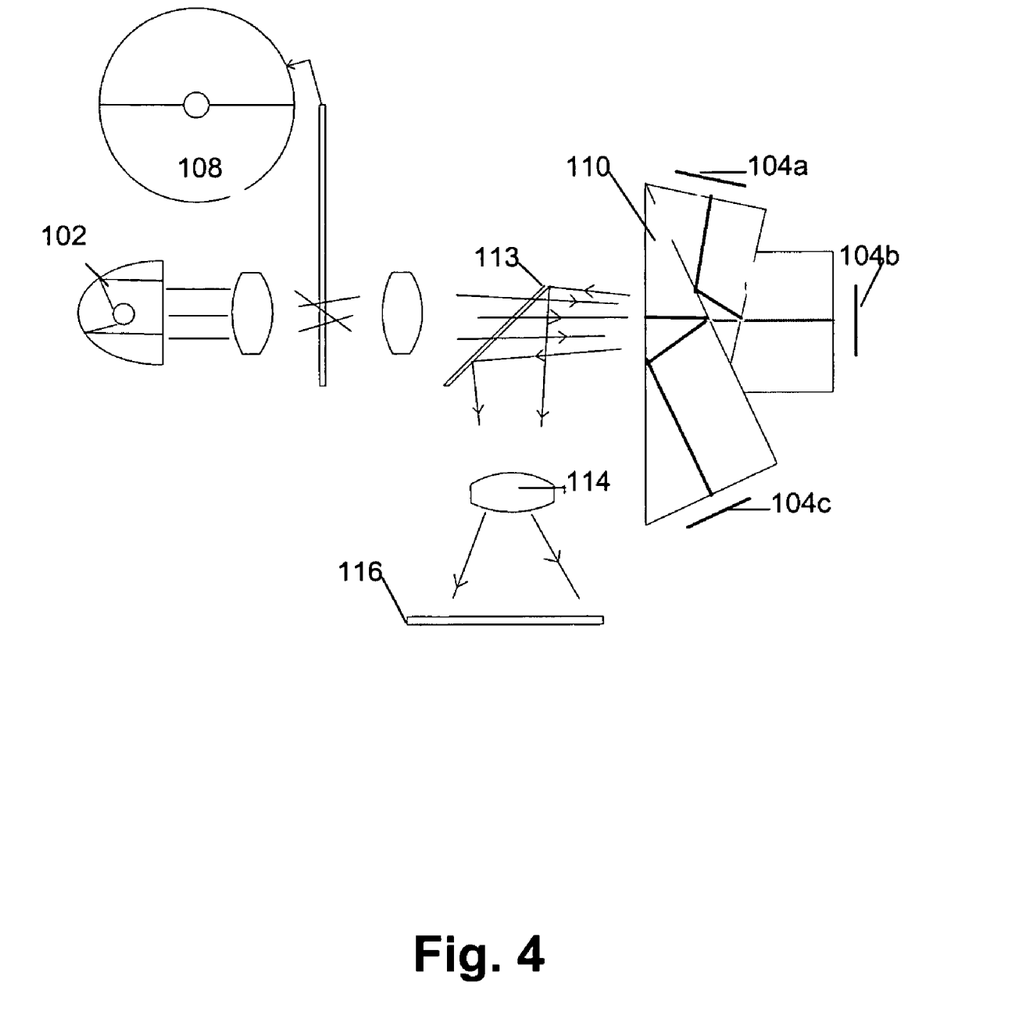
FIG. 4 illustrates an exemplary set-up of a display system with a dynamic and static selection means generating a plurality of primary colours according to an embodiment of the present invention.
Figure 5A:
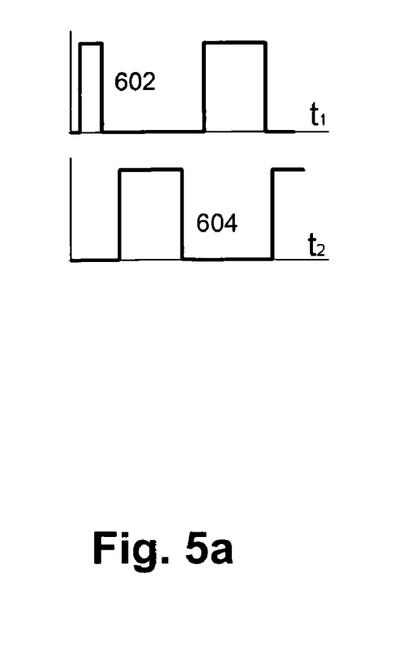
FIG. 5a and FIG. 5b show a schematic representation of the different spectral characteristics of the dynamic and static selecting means of the system as shown in FIG. 4.
Figure 5B:
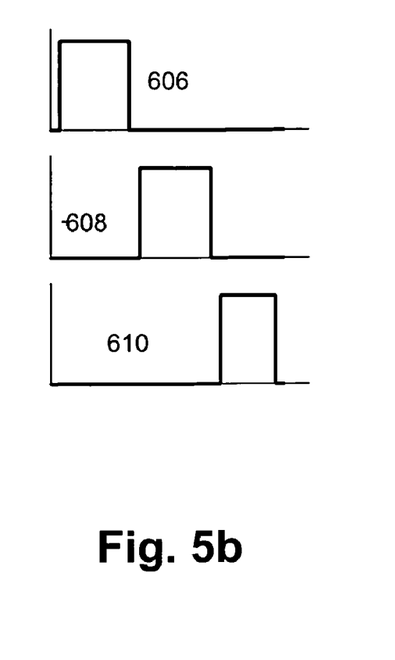
Figure 5C:
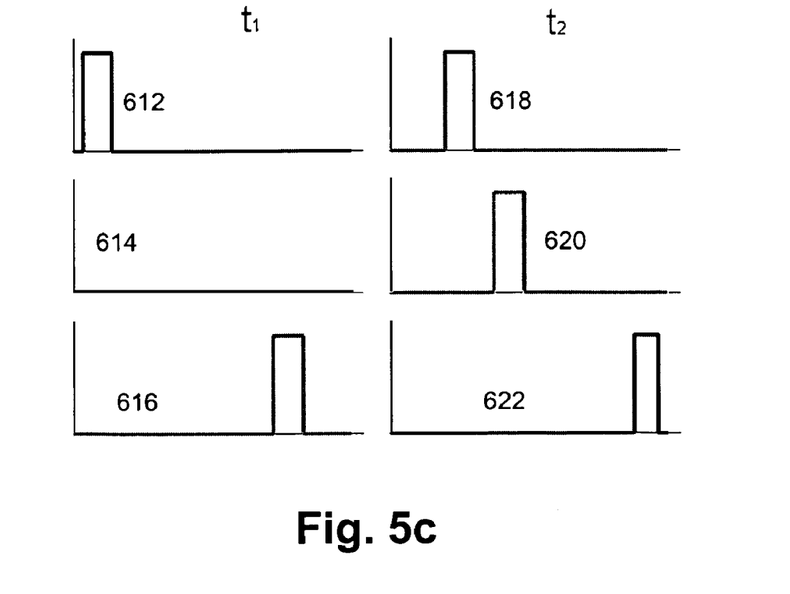
FIG. 5c is a schematic representation of the spectral characteristics of the primaries that can be generated by an imaging system as shown in FIG. 2, based on the spectral characteristics shown in FIG. 5a and FIG. 5b.

To illustrate the generation of the different sets of primary colour sub-beams, an example of spectral filtering using a dynamic spectral selecting means 108 and a static spectral selecting means 110 is shown in FIG. 5a, FIG. 5b and FIG. 5c for an imaging system as shown in FIG. 4. It again is to be noticed that the present invention is not limited hereto and that for different purposes different spectral characteristics can be selected and different types of imaging systems may be considered. The imaging system comprises an illumination source 102 and a dynamic spectral selecting means 108 being a spinning colour wheel in this case. It consists of two segments of 180 degrees each. The filter characteristics of both filters are demonstrated in FIG. 5a. The static selecting means 110 is a colour-splitting prism. The image modulators 104a, 104b, 104c are DLP-chips which reflect the modulated illumination back into the colour-splitting prism 110. The incoming and outgoing illumination beam can be separated by an optical component as the image modulation by the DLP-chips influences the direction of propagation of the illumination rays. Furthermore additional optical components can be seen. The spatial colour splitter 110 in this case consists out of 3 prism parts with dielectric coatings on their surfaces. The fact that these coatings are dielectric ensures that no illumination is absorbed; all illumination which is not transmitted is reflected. After the modulation of the illumination by the image modulators 104a, 104b, 104c, illumination is reflected and separated from the incoming beam by optical reflector 113 (e.g. a total internal reflection prism). Further on, the illumination is projected by an imaging system 114 onto the screen 116.

Figure 6A:
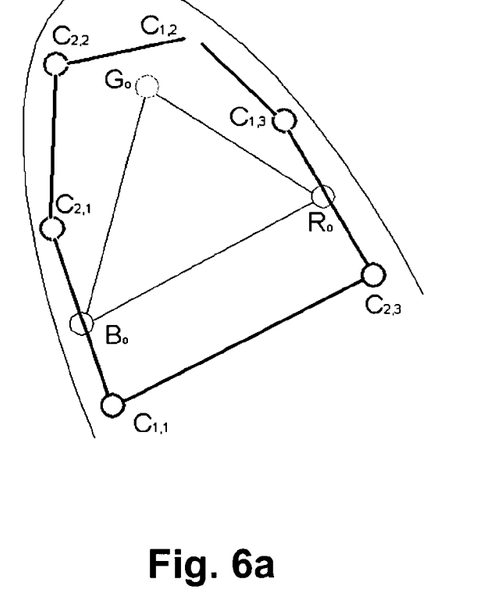
FIG. 6a and FIG. 6b is a schematic representation of the colour space transition that occurs in the imaging device by adding additional primary colours, according to embodiments of the present invention.

FIGS. 5a, 5b and 5c show an example of the possible wavelength separation by the dynamic and static selecting means 108, 110. The dynamic selecting means 108 in the present example is selected to filter in one time span of the time frame of generating an image according to the transmission pattern 602, while in the second time span of the time frame of generating an image filtering according to the transmission pattern 604 is obtained. The filtering characteristic of the static selecting means 110 is shown in FIG. 5b, illustrating the different transmission patterns 606, 608, 610 for the different filters of the static selecting means 110 for splitting the incident sets of primary colour sub-beams to the different image modulators 104a, 104b, 104c. The resulting spectral behaviour of the different primary colour sub-beams generated during a time frame for generating an image then are provided by curves 612, 614, 616, 618, 620, 622, whereby primary colour sub-beams with spectral behaviour 612, 614, 616 can be modulated according to image information by the image modulators during the first time span and primary colour sub-beams with spectral behaviour 618, 620, 622 can be modulated according to image information by the image modulators during the second time span of the time frame for generating an image. The resulting primary colour sub-beams will each have a different colour. The latter is illustrated in FIG. 6a, showing that the colour coordinates of the different primary colours $C_{i,j}$ with $i \in [1,2]$ and $j \in [1,3]$ in the colour-space diagram (x,y), or (u',v') will be different. The colour coordinates of primary colour sub-beam 612, 614, 616, 618, 620, 622 (indicated in FIG. 5c) are shown by $C_{1,1}$, $C_{1,2}$, $C_{1,3}$, $C_{2,1}$, $C_{2,2}$, $C_{2,3}$ respectively. It can be seen that the colour-space that can be addressed by linearly interpolating between the different primaries is much bigger than the triangle that originally could be addressed (indicated by linear interpolations of $R_o$, $G_o$ and $B_o$). In the present example, using a dynamic selecting means 108 by way of illustration being a dynamic filter, the dynamic filter is chosen such that each of the primary colour sub-beams in the first set differs from each of the primary colour sub-beams in the second set. This results in 6 different primary colours which can be produced by the imaging device. Nevertheless, the dynamic filter can be chosen in such a way that 6, 5 or 4 different primary colours can be produced by the projector. If for example the different segments of the dynamic selecting means only differ for one primary colour sub-beam, e.g. only the green primary colour sub-beam, the other primary colour sub-beams will remain identical. The available colour space for the imaging device then is larger than without dynamic selecting means 108, but smaller than when 6 primary colours are used.

Figure 6B:
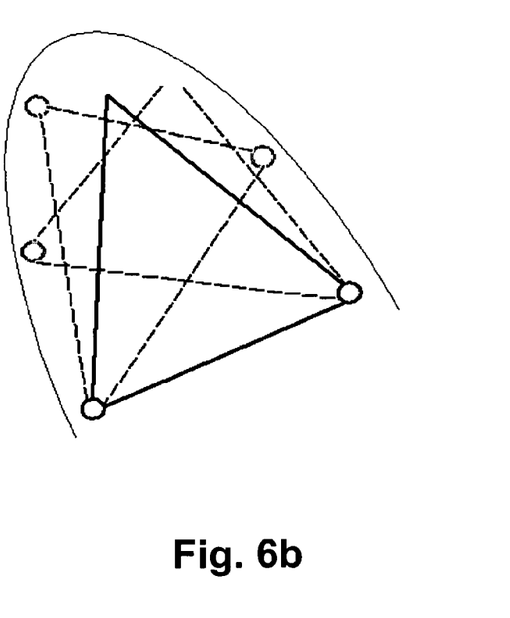

FIG. 6b demonstrates that it is not necessary to use the complete available color space. If one only want to use 3 primary colors for certain applications, but with a bigger color gamut than one was able to use prior to the introduction of a dynamic selection means, this is possible. In this case, a 3-dimensional color matrix representing the signal, has to be translated into a 3-dimensional color matrix in the RGB-color triangle. This can be an identical transformation $I_3(x,y,z)=(x,y,z)$, but this is not necessary. One can e.g. think of a transformation that transforms a certain color grid in the input signal into another one.

The total illumination flux modulation of the demonstrated example throughout a system as shown in FIG. 4 can be symbolically described, the imaging system shown being based on three different image modulators 104a, 104b, 104c. The initially generated flux, generated by the illumination source 102, which can be of all types, such as an arc lamp, or a LED-source, or a laser system, may be referred to as $\phi(\lambda)$. For simplicity, it is assumed that all optical components in the system, except the spatial and the temporal colour filters, do not influence the spectral characteristics of the illumination. To focus on the main concept of the present invention, it will be assumed that no additional illumination losses are present. A dynamic selecting means 108 in the present example is a colour wheel having N segments (N=2 in this example) with a periodicity P. Typically each period then consists out of N time-slots with a duration $\tau_i$ (i=1, 2, ... N) and well-defined transmission or reflection characteristics. In the present example, where a colour wheel is used, the transmission or reflection characteristics are specific spectral transmission or reflection characteristics. The transmission or reflection characteristic $T_{temp,i}(\lambda)$ of the dynamic selecting means, i.e. the dynamic filter, is constant during each respective time-slot $\tau_i$. The sum of all time-slots $\tau_i$ adds up to the period P. Whereas the total amount of illumination on the illumination path prior to the colour filter during a period P, hereafter called $L_{start}$, is identical to the multiplication of the flux and the time P, i.e.

$$L_{start} = \phi(\lambda) \cdot P \qquad [1]$$

the total amount of illumination during one period P behind the dynamic selecting means, e.g. filters (hereafter $L_{inter}$) is to be described as $$L_{inter} = \sum_N \phi(\lambda) \cdot \tau_i \cdot T_{temp,i}(\lambda). \qquad [2]$$

The static selecting means 110 filters the set of primary colour sub-beams in its different components, i.e. in different primary colour sub-beams, and guides these to the different image modulators. The static selecting means 110 typically has a spectral reflection or transmission characteristic $T_{spat}$ that allows to select the different primary colour sub-beams, i.e. it can be subdivided in 3 characteristic functions $T_{spat,1}$, $T_{spat,2}$ and $T_{spat,3}$. In the present example, optionally filtering in the blue, green and red wavelength range may be performed. It is to be noted that the specific spectral reflection or transmission characteristic in general may be different from these three wavelength ranges. In the present example (see FIG. 5b), ideally these functions can be described by the following functions:

$$\begin{cases} T_{spat,1} = \begin{cases} 1 \Leftrightarrow x \in [\lambda_0, \lambda_1] \\ 0 \Leftrightarrow x \notin [\lambda_0, \lambda_1] \end{cases} \\ T_{spat,2} = \begin{cases} 1 \Leftrightarrow x \in [\lambda_2, \lambda_3] \\ 0 \Leftrightarrow x \notin [\lambda_2, \lambda_3] \end{cases} \\ T_{spat,3} = \begin{cases} 1 \Leftrightarrow x \in [\lambda_4, \lambda_5] \\ 0 \Leftrightarrow x \notin [\lambda_4, \lambda_5] \end{cases} \end{cases} \quad [3]$$

with $$\lambda_0 \le \lambda_1 \le \lambda_2 \le \lambda_3 \le \lambda_4 \le \lambda_5$$

The total amount of illumination that will be the input for the image modulators 104a, 104b, 104c during a period of time P can be described by the functions $$L_{mod,j} = T_{spat,j}(\lambda) \cdot \sum_N \phi(\lambda) \cdot \tau_i \cdot T_{temp,i}(\lambda), \quad [4]$$

with $j \in [1, 3]$

Each illumination-image-modulator 104a, 104b, 104c optionally has a pixel-structure of m rows and n columns, (m,n) represents the pixel on the $m^{th}$ row and the $n^{th}$ column of the illumination-modulator. The image or information content $M_j(m,n,t_i)$ of each illumination-modulator can be altered for each time-slot $\tau_i$ with i=1, 2, . . . N. Each image modulator can therefore produce N independent images with a different spectral content.

The temporal response of the image modulators $M_j$ must be sufficient fast to produce the required number of "gray-levels" within each time-slot $\tau_i$. And as already mentioned above, the period P must be smaller than the integration or resolution time of the human eye.

The present invention is not limited to the given example. It can very well be, contrary to formula [3] from the example, that light having a specific wavelength λ is divided in two or more portions of identical or different non-zero intensity, of which one part is processed by image modulator 104a, while another part is processed by image modulator 104b and/or 104c. The nature of both the spatial and dynamic selecting means 108 and 110 depend on the application and its intended result. The present invention is even not limited to the visible wavelength spectrum. If, for example, one of the sub-beams has a non-negligible near infrared energy content, this can be used for night vision applications, in which the viewers of a display system use 'night vision photomultiplier glasses' which convert near infrared light to green light which can be perceived by the viewer.

Figure 7:
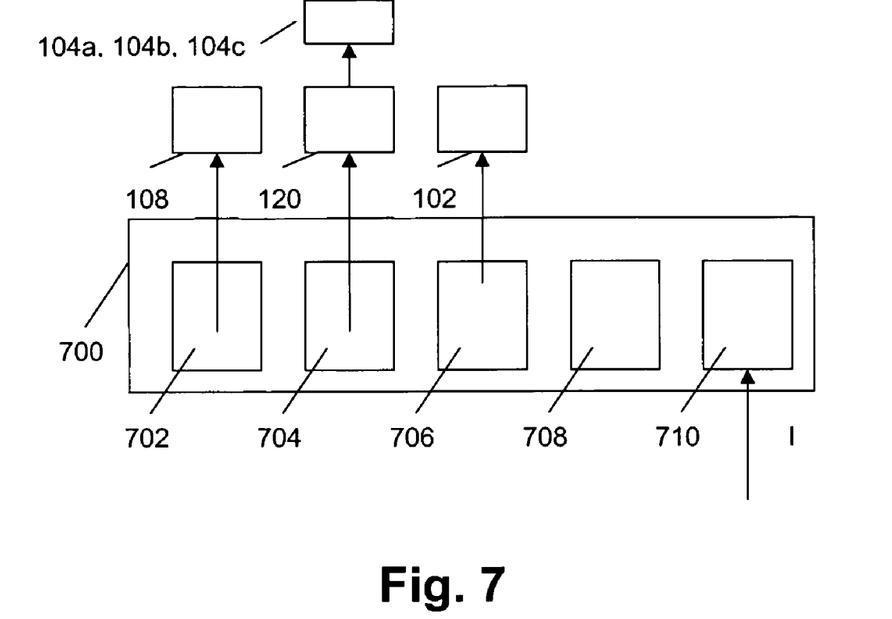
FIG. 7 is a schematic overview of a controller for controlling an imaging system, according to a second aspect of the present invention.

In a second aspect, the present invention relates to a controller 700 for controlling an imaging system 100 as described according to the first aspect of the present invention. An example controller 700 is illustrated by way of example in FIG. 7. The controller 700 thereby optionally comprises a dynamic selection controlling means 702 for controlling a variation of the filtering properties of the dynamic selecting means 108 provided in the illumination beam path for dynamic filtering on an incident illumination beam, optionally an incident white illumination beam. The controller 700 furthermore optionally comprises an image processing controlling means 704 for controlling the provision of image data to the image modulators 104a, 104b, 104c, thus directly or indirectly controlling the settable image modulators 104a, 104b, 104c. The controller 700 furthermore optionally provides synchronization between the dynamic selecting means 108 and the image modulators 104a, 104b, 104c. In other words optionally the synchronization means 118 as described in the first embodiment may be or may not be part of a controller 700 as described in the present aspect. The controlling of a provision of image data to the image modulators 104a, 104b, 104c may comprise providing generated image data to the image modulators 104a, 104b, 104c for each of a plurality of primary colour sub-beams generated by dynamic filtering and an additional static filtering of the illumination beam. The image data optionally may be obtained by processing image input data using predetermined algorithms, which may be performed by the image processing means 120 as described in more detail in the first aspect. The controller 700 furthermore may comprise a controlling means 706 for controlling the illumination source 102 for generating an illumination beam. The controller may be an electronic control system. The controller 700 optionally may control the overall operation of the imaging system. In addition there may be a data store 708 for storing parameters for controlling the imaging operation. The controller 700 may include a computing device, e.g. microprocessor, for instance it may be a micro-controller. In particular, it may include a programmable controller, for instance a programmable digital logic device such as a Programmable Array Logic (PAL), a Programmable Logic Array, a Programmable Gate Array, especially a Field Programmable Gate Array (FPGA). The controller 700 may control the operation of the dynamic selecting means 108 and/or the image modulators 104a, 104b, 104c in accordance with settable parameters stored in data store 80. Based on these parameters, the controller 700 may read the required information contained in the image buffer memory 710. Synchronisation between the dynamic selecting means 108 and the image modulating means 104a, 104b, 104c and possibly with the image processing means is performed by the controller by sending control signals to the different driving means.

As indicated above the controller 700 may be programmable, e.g. it may include a microprocessor or an FPGA. The present invention also includes a computer program product which provides the functionality of any of the methods according to the present invention when executed on a computing device. Further, the present invention includes a data carrier such as a CD-ROM or a diskette which stores the computer product in a machine readable form and which executes at least one of the methods of the invention when the program stored on the data carrier is executed on a computing device. Nowadays, such software is often offered on the Internet or a company Intranet for download, hence the present invention includes transmitting the computer product according to the present invention over a local or wide area network. The computing device may include a personal computer or a work station. The computing device may include one of a microprocessor and an FPGA.

In a third aspect, the present invention relates to a method for imaging in a multiple chip imaging system, wherein a larger number of primary colours is generated than the number of modulators present in the imaging system. The latter typically allows to increase the imaging quality, e.g. by increasing the dynamic range that can be imaged whereby still sufficient gray levels can be shown or e.g. by increasing the colour gamut. The method for imaging colour images optionally comprises generating an illumination beam. For a single colour image to be imaged, the method comprises dynamically selecting different sets of primary colour sub-beams and statically selecting for each of the subsequently generated different sets of primary colour sub-beams, primary colour sub-beams. The statically selected primary colour sub-beams furthermore are modulated for generating the single colour image to be imaged. Optionally the process may be repeated for a plurality of colour images, thus allowing to display moving images or video as well as static images or semi-static images. The method typically may be performed using imaging systems as described in more detail in the first aspect of the present invention. Modulating according to image information the statically selected primary colour sub-beams may comprise modulating according to image information each of the statically selected primary colour sub-beams to contribute to a predetermined colour or a predetermined emission intensity for pixels of the single colour images. The method for imaging furthermore may comprise generating different sets of primary colour sub-beams wherein the different sets differ at least in one primary colour sub-beam in colour or in emission intensity.

Figure 8A:
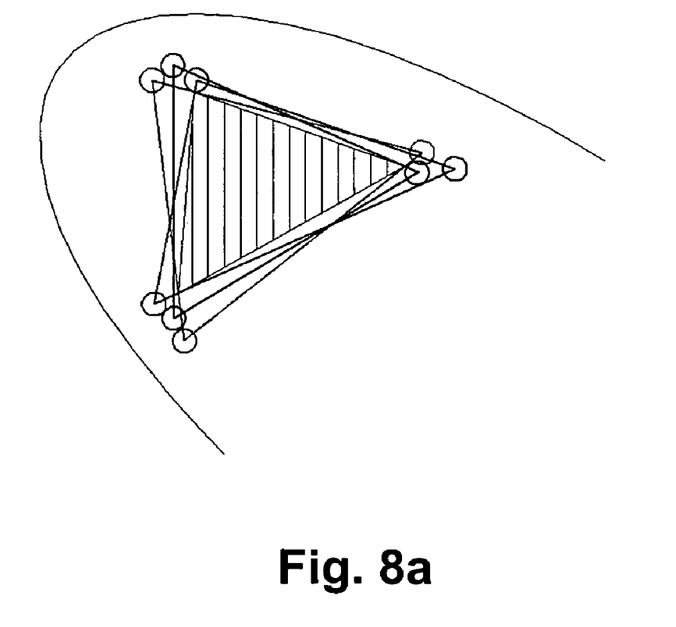
FIG. 8a and FIG. 8b show obtainable colour triangles illustrating one of the advantages of having more primary colours in a multi-system setup where colour matching is needed.
Figure 8B:
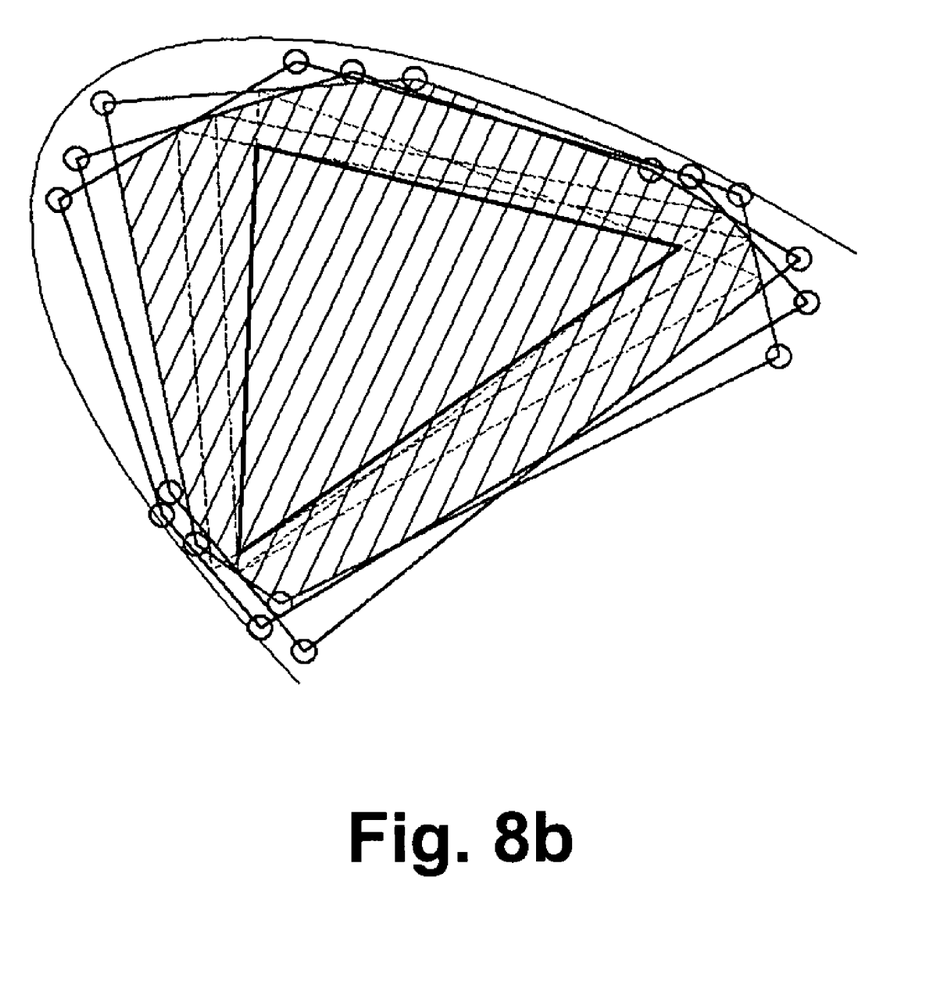

A fourth aspect of the present invention relates to methods and systems wherein imaging using multiple imaging systems is combined. In embodiments according to the present aspect, imaging systems as described in the first aspect are combined in a multi-imaging set-up to generate one larger image. In other words, one embodiment of the fourth aspect of the present invention relates to a multi-imaging system comprising a plurality of imaging systems whereby at least one, optionally more and even optionally all imaging systems are imaging systems according to embodiments of the first aspect of the present invention. One can for example imagine a planetarium dome where a number of projection systems, for example 7 projection systems, are combined to completely fill the dome screen with image content. A huge quality issue for multiple projector systems are the projector to projector differences, in both brightness and colour. It can be understood that for a given system of N imaging systems, e.g. N projection systems, each of these N projection systems having a colour gamut based on three primaries, a common colour gamut space can be retrieved. This is demonstrated on FIG. 8a. With electronic means (signal processing), a colour transformation can be performed so that an input signal which is consisting of pure red is treated as it also is containing some green or blue, so that the final displayed colour corresponds to the colour of a second and/or third, fourth, . . . imaging systems, e.g. projection means. However, as can be seen, because of the sharp nature of a triangle, the common colour gamut represented by the common colour triangle 802 is reduced rapidly, even if no big variation between all gamuts is witnessed. On FIG. 8b, we started from an analogue situation, where an arbitrary number of N imaging systems, e.g. projection systems (N=3 in this example, see dashed line on FIG. 8b) is combined, but wherein the multi-imaging system comprises imaging systems as described in embodiments of the first aspect of the present invention. The triangle 802 reproduces the 'common' colour gamut triangle. In the present example, it has been assumed that a dynamic selecting filter has been added in the imaging systems which splits each primary colour spectral band into two spectrally distinguished bands, leading to 6 primary colours for each projection system. As can be seen from the common gamut space (dashed), a combination of hexagons, shapes which are not nearly as sharp as triangles, leads to a big common zone, much larger than the triangular zone defined earlier. It is possible to define a common colour triangle 802, but this one can be much larger than the common colour triangle 802 for a system not based on imaging systems according to embodiments of the first aspect of the present invention. The present example illustrates that, next to the possibility of colour gamut matching between different projectors in general, the colour gamut for a multi-system equipped with dynamic selecting means, e.g. filters as described in embodiments of the first aspect of the present invention will be reduced less dramatically for high quantities of projection systems. The colour matching however will imply much more processing, as the brightness of a certain point in colour space will no longer be a straightforward additive calculation based on three separate primaries, but in this case, it will have input of 6 primaries (or N×M, where N represents the number of image modulators, and M represents the number of different filters applied in the dynamic selection means), of which 3 (=N) sets of 2 (=M) are mutually connected as they are formed from the same 'stationary' primary. Similar as described for the first aspect, a multi-image processing means may be used for transforming the image to be displayed in the appropriate format.

In one embodiment, the multi-imaging system according to the present aspect furthermore may be adapted for selecting whether or not to use the dynamic selecting means. For example, if one imagines a total system consisting of a plurality of e.g. N imaging systems 100, of which a number (e.g. L<N or L=N) is equipped with a dynamic selecting means, it is an opportunity that for some applications, all imaging systems behave identically, e.g. thereby not using the dynamic selecting means, whereas other imaging applications which only need L systems to be combined can be used in the 'extended' mode, using the dynamic selecting means.

It is to be understood that although preferred embodiments, specific constructions and configurations, as well as materials, have been discussed herein for devices according to the present invention, various changes or modifications in form and detail may be made without departing from the scope and spirit of this invention. For example, whereas the method has been exemplified by systems and methods wherein the dynamic selecting means is used earlier, i.e. closer to the illumination source, in the light path than the static selecting means, method and system embodiments also are envisaged wherein the static selecting means is performed in the light path closer to the illumination source than the dynamic selecting means. The same principles are then valid, whereby the dynamic selecting means then may comprise a plurality of dynamic selecting sub-components, each performing a dynamic selection in the different light pats generated between the static selecting means and the light modulators.

The invention claimed is:

1. An imaging system for displaying colour images, the imaging system comprising an illumination source for generating an illumination beam, an illumination splitting means and a plurality of image modulators, wherein the illumination splitting means comprises:
   a dynamic selecting means adapted for receiving at least one illumination beam and subsequently generating different sets of primary colour sub-beams from the at least one illumination beam
   a static selecting means adapted for receiving at least one illumination beam and splitting the at least one illumination beam in different sets of primary colour sub-beams from the at least one illumination beam,
wherein, for generating a single colour image, the dynamic selecting means and the static selecting means are adapted for cooperating such that subsequently generated different sets of primary colour sub-beams generated by the dynamic selecting means are directed to the static selecting means where primary colour sub-beams of each of said subsequently generated different sets are directed by the static selecting means to the plurality of image modulators for modulating each of the directed primary colour sub-beams from said sets for generating the single colour image to be imaged or such that different sets of primary colour sub-beams generated by the static selecting means are directed to the dynamic selecting means where they are used to generate subsequently generated further sets of primary colour sub-beams and directed to the plurality of image modulators for modulating each of the directed primary colour sub-beams from said further sets for generating the single colour image to be imaged.

2. An imaging system according to claim 1, wherein an image modulator is adapted for modulating each of said directed primary colour sub-beams to contribute to a predetermined colour or a predetermined emission intensity for pixels of said single colour image.

3. An imaging system according to claim 1, wherein said different sets of primary colour sub-beams comprise at least one primary colour sub-beam having a different colour.

4. An imaging system according to claim 3, wherein said dynamic selecting means is adapted for subsequently providing different spectral filters in the illumination beam path.

5. An imaging system according to claim 1, wherein said static selecting means comprises a plurality of fixed spectral filters for directing different primary colour sub-beams to different image modulators.

6. An imaging system according to claim 4 wherein said static selecting means comprises a plurality of fixed spectral filters for directing different primary colour sub-beams to different image modulators.

7. An imaging system according to claim 6, wherein different spectral filters of said dynamic selecting means have distinguished spectral overlap with different fixed spectral filters of said static selecting means.

8. An imaging system according to claim 6, wherein different spectral filters of said dynamic selecting means have a spectral overlap with different fixed spectral filters of said static selecting means in the same spectral ranges, but wherein the spectral overlap for a first spectral filter of said dynamic selecting means is substantially more narrow than the spectral overlap for a second spectral filter of said dynamic selecting means resulting in a first set of primary colour sub-beams having a substantially higher intensity than a second sub-set of primary colour sub-beams and in a second set of primary colour sub-beams having a substantially higher colour purity than a first sub-set of primary colour sub-beams.

9. An imaging system according to claim 1, wherein said different sets of primary colour sub-beams comprise at least one primary colour sub-beam having a different emission intensity.

10. An imaging system according to claim 9, wherein said dynamic selecting means is adapted for subsequently providing different neutral density filters in the illumination beam path.

11. An imaging system according to claim 1, wherein the number of different primary colour sub-beams generated by the illumination splitting means is larger than the number of image modulators of the imaging system.

12. An imaging system according to claim 1, comprising a synchronisation means for synchronising said dynamic selecting means for subsequently generating different sub-sets of primary colour sub-beams with said plurality of image modulators for modulating each of said primary colour sub-beams of said different sets.

13. An imaging system according to claim 1, the illumination source comprising a plurality of different coloured illumination sub-sources, wherein the dynamic selecting means is a controller for controlling the plurality of different coloured illumination sub-sources.

14. An imaging system according to claim 1, the illumination splitting means adapted for splitting the illumination beam in a part substantially having a wavelength between 400 nm and 680 nm and a part substantially having a wavelength outside that region.

15. An imaging system according to claim 1, wherein the imaging system is adapted for temporary selectively positioning the dynamic selecting means in the light path of the illumination beam.

16. An imaging system according to claim 1, the dynamic selecting means comprises a colour wheel, wherein a speed of the colour wheel is selected for determining the contribution of the different colour sub-beams.

17. A controller for controlling an imaging system as described in claim 1, the controller comprising
- a dynamic filter controlling means for controlling a variation of the filtering properties of the dynamic selecting means provided in the illumination beam path for dynamic filtering of an illumination beam and
- an image processing controlling means for controlling a provision of image data to a plurality of illumination modulators, wherein said controller provides synchronisation between said dynamic selecting means and said image modulators.

18. A controller according to claim 17, wherein controlling a provision of image data to the image modulators comprises providing generated image data to the image modulators for each of a plurality of primary colour sub-beams generated by said dynamic filtering and an additional static filtering of the illumination beam.

19. An imaging setup for imaging colour images, the imaging setup comprising a plurality of imaging systems, at least one imaging system being an imaging system according to claim 1, the plurality of imaging system adapted for together generating a single colour image.

20. A method for imaging colour images, the method comprising
- generating an illumination beam
- for a single colour image to be imaged, dynamically selecting different sub-sets of primary colour sub-beams and statically selecting for each of the subsequently generated different sub-sets of primary colour sub-beams, primary colour sub-beams, and
- modulating said statically selected primary colour sub-beams for generating said single colour image to be imaged using a plurality of image modulators.

21. A method according to claim 20, wherein modulating said statically selected primary colour sub-beams comprises modulating each of said statically selected primary colour sub-beams to contribute to a predetermined colour or a predetermined emission intensity for pixels of said single colour image.

* * * * *